(12) United States Patent
Suzuki et al.

(10) Patent No.: US 8,790,012 B2
(45) Date of Patent: Jul. 29, 2014

(54) JOURNAL BEARING DEVICE

(71) Applicant: Hitachi, Ltd., Tokyo (JP)

(72) Inventors: Kenta Suzuki, Hitachinaka (JP); Makoto Hemmi, Mito (JP); Tomoaki Inoue, Mito (JP); Kenichi Murata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/771,699

(22) Filed: Feb. 20, 2013

(65) Prior Publication Data
US 2013/0223775 A1 Aug. 29, 2013

(30) Foreign Application Priority Data

Feb. 29, 2012 (JP) ................. 2012-042690

(51) Int. Cl.
*F16C 33/10* (2006.01)
*F16C 9/02* (2006.01)

(52) U.S. Cl.
USPC .......................... 384/288; 384/313

(58) Field of Classification Search
CPC ............... F16C 33/1045; F16C 9/02
USPC ....... 384/288, 294, 429, 430, 313; 123/196 R
See application file for complete search history.

(56) References Cited

U.S. PATENT DOCUMENTS

| 6,676,296 | B2* | 1/2004 | Inoue et al. ............... 384/276 |
| 8,151,758 | B2* | 4/2012 | Ni et al. ............... 123/196 R |
| 2009/0238506 | A1 | 9/2009 | Inoue et al. |

FOREIGN PATENT DOCUMENTS

| DE | 965 458 C | 6/1957 |
| DE | 23 49 190 A1 | 3/1975 |
| GB | 781085 A | 8/1957 |
| JP | 63-62623 U | 4/1988 |
| JP | 2005-69283 A | 3/2005 |
| JP | 2009-222210 A | 10/2009 |

OTHER PUBLICATIONS

Extended European Search Report dated Jun. 14, 2013 (seven (7) pages).

* cited by examiner

*Primary Examiner* — Thomas R Hannon
(74) *Attorney, Agent, or Firm* — Crowell & Moring LLP

(57) ABSTRACT

In a journal bearing device having an upper bearing liner, a lower bearing liner, an upper base metal and a lower base metal, the lower bearing liner is divided into a sliding portion having a sliding surface and a clearance portion provided with a space between the lower bearing liner and a rotor, and is provided with an oil path formed on a back side of the sliding portion and extending from a border portion between the sliding portion and the clearance portion toward an upstream side in the rotational direction of the rotor, and an oil supply hole extending from an upstream end portion of the oil path to the sliding surface, and the lower base metal has an oil supply path and extending from an outer circumferential side of the lower base metal to the oil path at the border portion.

17 Claims, 11 Drawing Sheets

BEARING WIDTH DIRECTION

BEARING WIDTH
DIRECTION

BEARING WIDTH
DIRECTION

JOURNAL BEARING DEVICE

TECHNICAL FIELD

The present invention relates to a journal bearing device (hereinafter also referred to simply as a "bearing device" or "bearing").

CLAIM OF PRIORITY

The present application claims priority from Japanese Patent application serial No. 2012-42690, filed on Feb. 29, 2012, the content of which is hereby incorporated by reference into this application.

BACKGROUND ART

Relevant background art is described in Japanese Unexamined Patent Publication No. 2009-222210 (PTL 1). In the PTL 1, a journal bearing device is disclosed in which lubricant supplied to the outer circumference on the load side of the bearing (the lower bearing liner) to cool the bearing is subsequently supplied to the sliding surface of the bearing, thereby cooling the bearing and reducing bearing loss.

In the PTL 1, a partial-bearing construction aimed at reducing bearing loss is described with reference to FIGS. 5 and 6 of the PTL 1. In the partial-bearing construction, a bearing is comprised of a bearing base metal and a bearing liner provided separately from the bearing base metal with the bearing base metal provided over the outer circumferential side of the bearing liner, and the bearing liner has a bearing sliding surface, on each of the load side and the counter load side thereof, covering a bearing liner area where an oil film pressure is generated.

CITATION LIST

Patent Literature

[PTL 1] Japanese Unexamined Patent Publication No. 2009-222210

SUMMARY OF INVENTION

Technical Problem

In the field of journal bearing devices for supporting rotary shafts included in industrial rotary machines, for example, steam turbines and gas turbines which are required to be highly reliable, there is need for improving machine efficiency by reducing bearing loss and for a cost reduction to be achieved by reducing the amount of lubricant to be used and by making such auxiliary machines as lubricant tanks and pumps smaller.

In a bearing, bearing loss is caused by oil film shearing on the sliding surface of the bearing, so that reducing the area of the sliding surface of a bearing can reduce the loss caused in the bearing. Therefore, adopting a partial-bearing construction in which, as described in the PTL 1, a portion of the sliding surface of a bearing is cut away makes it possible to reduce bearing loss.

Furthermore, to reduce the amount of lubricant to be used for a bearing, it is necessary to reduce the temperature rise on the sliding surface of the bearing. Generally, the sliding surface of a bearing is made of a metal with a low melting point. Therefore, when the amount of lubricant supplied to a bearing is reduced, the temperature of the bearing rises causing the bearing strength to be reduced to possibly result in a seizure of the sliding surface of the bearing. As described in the PTL 1, supplying lubricant to a load-side portion of the outer circumference of a bearing (the lower bearing liner) is an effective way to cool the sliding surface of the bearing.

According to the PTL 1, however, lubricant is supplied separately to the counter load side of a bearing (upper part of the bearing) and to the load side of a bearing (lower part of the bearing). In that way, the lubricant supplied to the sliding surface in the upper part of the bearing is discharged to outside the bearing through a cut-away portion without reaching the lower part of the bearing.

The temperature rise in the upper part of a bearing is extremely small compared with the temperature rise in the lower part of the bearing. In the bearing construction described in the PTL 1, therefore, the lubricant supplied to the upper part of the bearing is not effectively utilized to cool the bearing.

An object of the present invention is to provide a journal bearing device which has a partial-bearing construction and in which the lubricant supplied to the bearing is effectively used to cool the bearing making it possible to reduce the amount of lubricant to be used.

Solution to Problem

The journal bearing device according to the present invention has an upper bearing liner included in an upper part thereof, a lower bearing liner included in a lower part thereof, an upper base metal provided on an outer circumferential side of the upper bearing liner, and a lower base metal provided on an outer circumferential side of the lower bearing liner. In the journal bearing device, the lower bearing liner is divided into a sliding portion having a sliding surface and a clearance portion provided with a space between the lower bearing liner and a rotary shaft to be supported by the bearing device, and is provided with an oil path formed on a back side of the sliding portion and extending from a border portion between the sliding portion and the clearance portion toward an upstream side in a rotational direction of the rotary shaft thereby letting lubricant flow on the back side of the sliding portion from the border portion toward the upstream side, and an oil supply hole extending from an upstream end portion of the oil path to the sliding surface of the sliding portion thereby supplying the lubricant, flowing down the oil path, from an upstream end portion of the sliding portion onto the sliding surface. In the journal bearing device, the lower base metal has an oil supply path extending from the outer circumferential side of the lower base metal to the oil path at the border portion thereby supplying lubricant from outside the bearing device to the oil path. In the journal bearing device, whole lubricant to be supplied into the bearing device passes through the oil path.

Advantageous Effects of Invention

According to the present invention, the area of the sliding surface of a bearing can be reduced to reduce bearing loss. Also, according to the present invention, the whole low-temperature lubricant supplied to inside the bearing first passes the highest-temperature portion of the sliding surface of the bearing, so that the efficiency of cooling by the lubricant is improved to prevent the strength of the low melting metal making up the sliding surface of the bearing from being reduced. This makes it possible to suppress rising of the bearing temperature caused when the amount of lubricant supplied to the bearing is reduced more than before.

Thus, the present invention can provide a journal bearing device which has a partial-bearing construction and in which the lubricant supplied to the bearing is effectively used to cool the bearing making it possible to reduce the amount of lubricant to be used.

DESCRIPTION OF EMBODIMENTS

Embodiments of the present invention will be described below with reference to drawings.

EXAMPLE 1

A first embodiment of the present invention will be described with reference to FIGS. 1 to 4.

Figure 1:
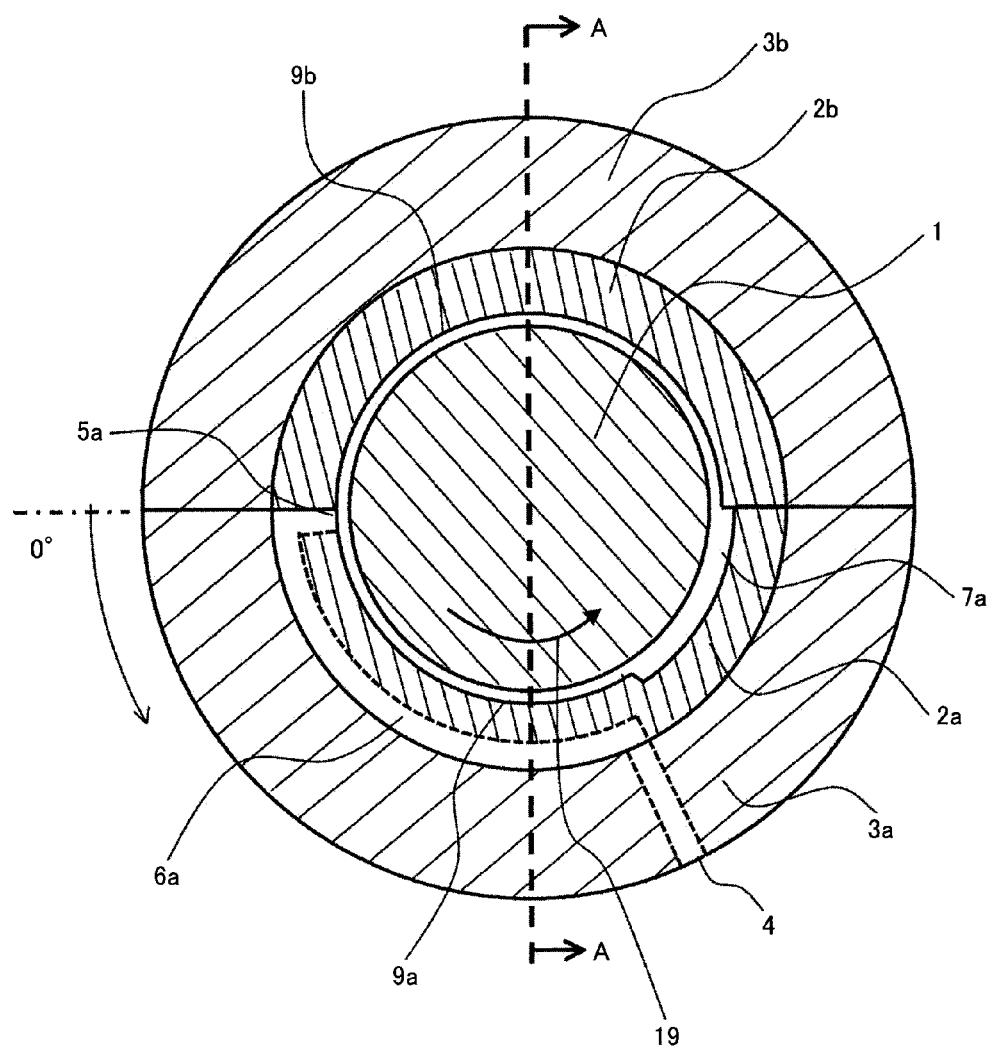
FIG. 1 is a vertical cross-sectional view of a journal bearing device according to a first embodiment of the present invention.

FIG. 1 is a vertical cross-sectional view of a journal bearing device according to the first embodiment of the present invention. The journal bearing device of the present embodiment has a two-piece construction comprised of an upper part and a lower part and is installed such that a rotor 1 of a rotary machine is held between the upper part and the lower part. The upper and lower parts of the journal bearing device are coupled to each other with bolts (not shown). The rotor 1 is supported by the journal bearing device to be rotatable in the direction indicated by an arrow 19 in FIG. 1.

The lower part of the bearing device includes a lower bearing liner 2a rotatably supporting the rotor 1 and a lower base metal 3a attached to the outer circumference of the lower bearing liner 2a to fix and support the lower bearing liner 2a. The upper part of the bearing includes an upper bearing liner 2b rotatably supporting the rotor 1 and an upper base metal 3b attached to the outer circumference of the upper bearing liner 2b to fix and support the upper bearing liner 2b. The inner circumferential surfaces of the lower bearing liner 2a and upper bearing liner 2b are lined with, for example, white metal making up sliding surfaces 9a and 9b over which the rotor 1 slides.

According to the present embodiment, the lower bearing liner 2a has a sliding portion and a clearance portion. The sliding portion of the lower bearing liner 2a is provided with the sliding surface 9a. The clearance portion of the lower bearing liner 2a is provided in a downstream end portion of the lower bearing liner 2a in the rotational direction of the rotor 1. Further, the clearance portion of the lower bearing liner 2a is provided by cutting out the sliding surface 9a of the lower bearing liner 2a in a downstream end portion thereof, thereby forming a cut-away portion 7a. The cut-away portion 7a extends, in the bearing width direction, over a part or a whole of the bearing width thereby forming a space between the lower bearing liner 2a and the rotor 1. The cut-away portion 7a is required to be deep enough to prevent formation of an oil film which causes bearing loss. To facilitate positioning of the lower bearing liner 2a, it is desirable to leave the downstream end portion of the lower bearing liner 2a with an appropriate thickness in the radial direction (the depth direction of the cut-away portion) without entirely cutting away the downstream end portion. Also, the border between the cut-away portion 7a and the sliding surface 9a may be smooth. The range of the cut-away portion 7a will be described later with reference to FIG. 3.

The lower bearing liner 2a has one or more oil paths 6a formed on the outer circumferential surface thereof. The oil paths 6a are used to supply lubricant into the bearing. Each oil path 6a circumferentially extends over the outer circumference of the sliding surface 9a (the sliding portion) leading from the back side of the border between the sliding surface 9a and the cut-away portion 7a (a border portion between the sliding portion and the clearance portion) to the upstream end, in the rotational direction of the rotor 1, of the lower bearing liner 2a. With the oil paths 6a provided on the back side of the sliding surface 9a excluding the cut-away portion 7a, lubricant is caused to pass the back side of the sliding surface 9a without entering the back side of the cut-away portion 7a.

The upstream end in the rotational direction of the rotor 1 of each oil path 6a is communicated with an oil supply hole 5a open at an upstream end portion in the rotational direction of the rotor 1 of the sliding surface 9a. In other words, each oil supply hole 5a extends from the upstream end portion of each oil path 6a toward the sliding surface. This causes the lubricant coming down each oil path 6a to flow onto the sliding surface 9a through the oil supply hole 5a, i.e. to be provided between the sliding surface 9a and the rotor 1.

The downstream end in the rotational direction of the rotor 1 of each oil path 6a is communicated with an oil supply path 4 formed through the lower base metal 3a. The oil supply path 4 is connected to an oil supply pump (not shown) provided outside the bearing. The lubricant supplied from outside through each oil supply path 4 enters the corresponding oil path 6a to be then supplied onto the sliding surface 9a via the corresponding oil supply hole 5a. The downstream end of each oil path 6a in the rotational direction of the rotor 1 is located near the back side of the border between the sliding surface 9a and the cut-away portion 7a and, at the downstream end, the oil path 6a is communicated with the oil supply path 4.

Figure 2:
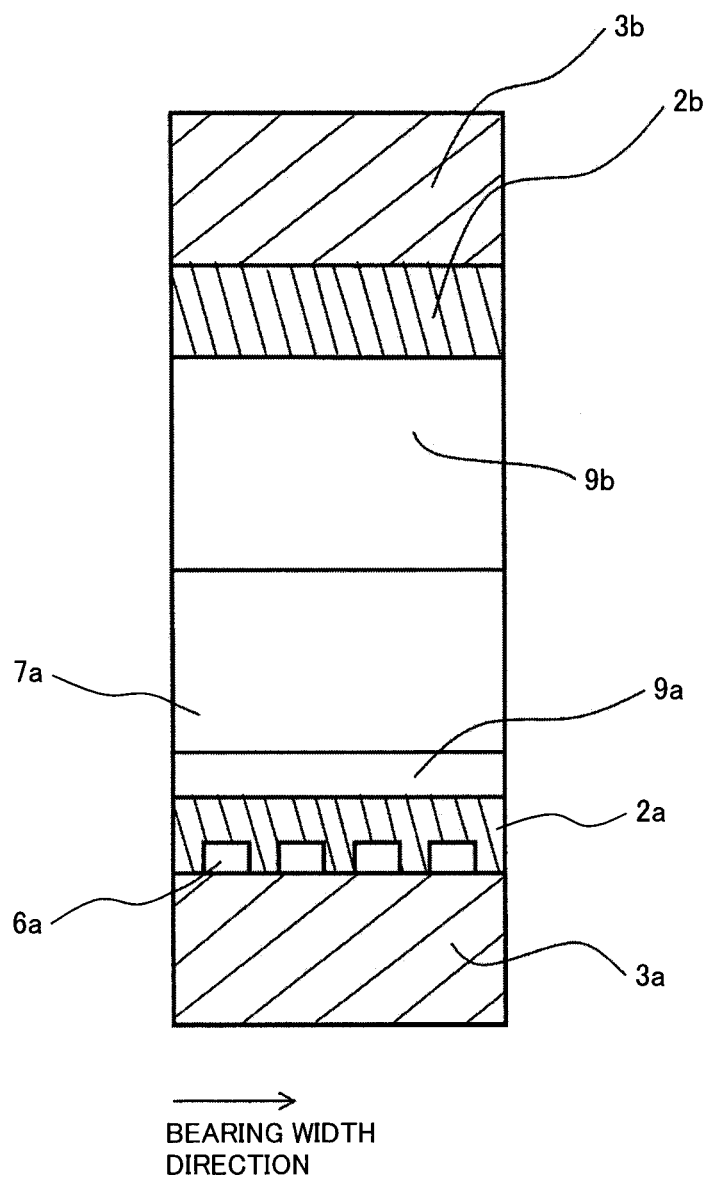
FIG. 2 is a sectional view, taken along line A-A in FIG. 1, of the journal bearing device shown in FIG. 1.

FIG. 2 is a sectional view, taken along line A-A in FIG. 1, of the journal bearing device shown in FIG. 1. In FIG. 2, the rotor 1 is omitted. Even though, in the present embodiment, the cut-away portion 7a extends over the whole bearing width, it may be formed to extend over only a part of the bearing width. In the present embodiment, plural oil paths 6a are provided on the back side of the sliding surface 9a, in the bearing width direction. This makes it possible to cool the entire sliding surface 9a. The oil paths 6a are formed by forming grooves on the outer circumferential surface of the lower bearing liner 2a.

Figure 3:
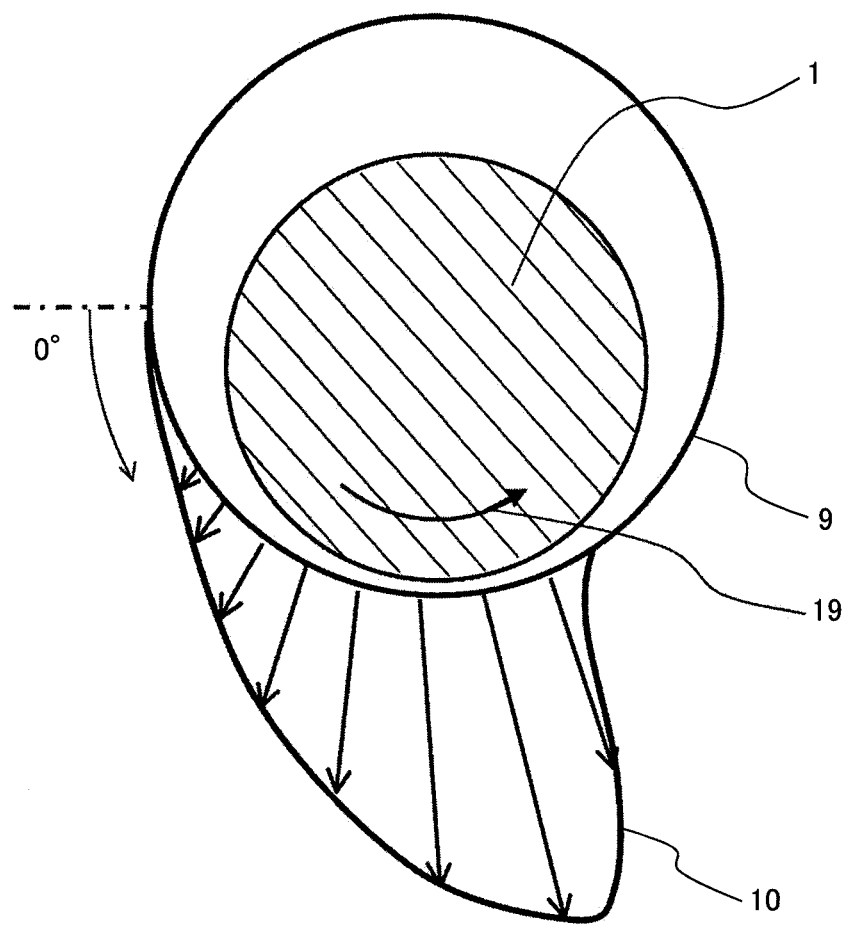
FIG. 3 is a diagram showing an oil film pressure distribution over the sliding surface of a general journal bearing device.

Next, the range of the cut-away portion formed on the sliding surface 9a will be described. FIG. 3 is a diagram showing an oil film pressure distribution over the sliding surface 9 of a general journal bearing device. In the oil film pressure distribution 10 over the sliding surface 9, the oil film pressure is maximum at a downstream portion, in the rotational direction of the rotor 1, beyond a 90° portion with respect to the upstream 0° portion defined by a horizontal plane crossing the central axis of the bearing. At further downstream of the 90° portion, the oil film pressure sharply drops to allow some portion of the sliding surface 9 to be free of oil film pressure. This occurs at around a 120° portion or at further downstream though dependent on the load applied by the rotor 1 and the operating condition of the bearing. Cutting away such portion free of oil film pressure of the sliding surface 9 does not affect the performance of the bearing. In the present embodiment, therefore, a portion of the sliding surface 9 where no oil film pressure is generated or where the oil film pressure is negative is cut away forming the cut-away portion 7a. To be more specific, a portion which is, in the rotational direction of the rotor 1, beyond a 120° portion of the sliding surface 9, or in other words, a portion which is, in the rotational direction of the rotor 1, beyond a 30° portion with respect to the direction of the load applied by the rotor 1 (the direction in which the weight of the rotor 1 is applied) is cut away forming the cut-away portion 7a. Most preferably, the cut-away portion 7a is as wide as the whole bearing width, but it is still effective even when it is narrower than the bearing width.

The operation and effects of the present embodiment will be described below.

According to the present embodiment, the lubricant supplied from outside the bearing to inside the bearing all flows into the oil paths 6a via the corresponding oil supply paths 4. The lubricant then flows, oppositely to the rotational direction of the rotor 1, through the oil paths 6a to be supplied to the sliding surface 9a via the oil supply holes 5a.

On the sliding surface 9a, a portion more downstream in the rotational direction of the rotor 1 is higher in temperature. In the present embodiment, fresh lubricant just supplied, i.e. lubricant in a coolest state, is directly supplied to around the back side of the border between the sliding surface 9a and the cut-away portion 7a. Namely, the lubricant in a coolest state is first supplied to the portion highest in temperature of the lower bearing liner 2a. Furthermore, with the lubricant made to flow through the oil paths 6a oppositely to the rotational direction of the rotor 1, the lubricant is lower in temperature when flowing over a part higher in temperature of the sliding portion of the lower bearing liner 2a. This improves the efficiency of cooling by the lubricant. Still furthermore, the whole lubricant to be supplied into the bearing is made to flow through the oil paths 6a. Hence, the whole lubricant is made use of to cool the high-temperature portion of the sliding portion of the lower bearing liner 2a. This improves the effect of cooling by the lubricant and suppresses reduction of the strength of a low melting metal making up the sliding surface 9a.

According to the present embodiment, by improving a route inside a bearing through which lubricant is supplied into the bearing from outside the bearing, it is possible to improve the cooling performance of the lubricant and to suppress rising of the bearing temperature. This makes it possible to reduce the amount of lubricant to be used and to realize a bearing device requiring less lubricant.

Also, according to the present embodiment, the cut-away portion 7a is provided on the sliding surface making the sliding area of the lower bearing liner 2a smaller. This reduces the bearing loss due to oil film shearing.

EXAMPLE 2

A second embodiment of the present invention will be described below. Constituent elements identical to those used in the first embodiment will be assigned identical reference numerals and their description will be omitted.

Figure 4:
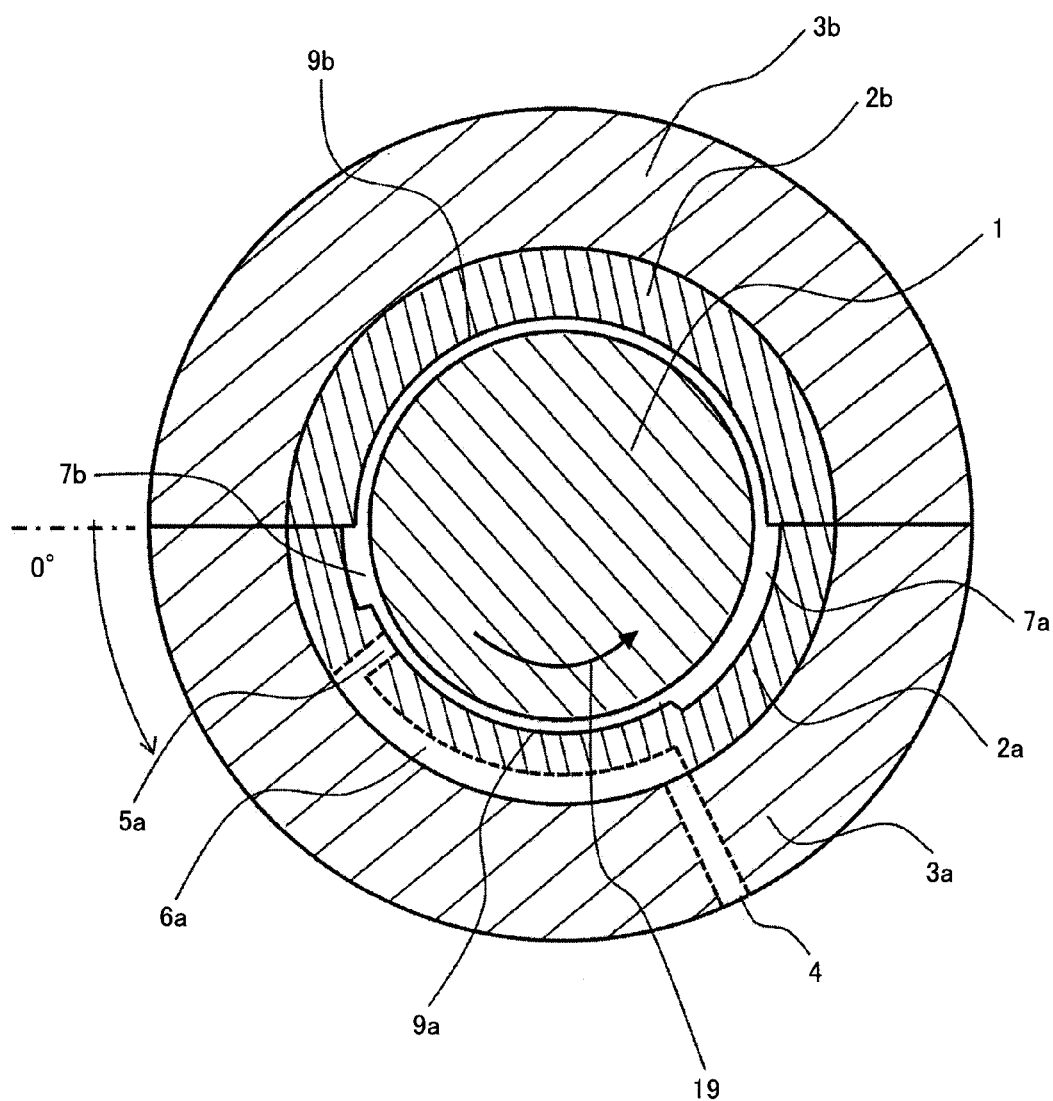
FIG. 4 is a vertical cross-sectional view of a journal bearing device according to a second embodiment of the present invention.

FIG. 4 is a vertical cross-sectional view of a journal bearing device according to the second embodiment of the present invention. The second embodiment differs from the first embodiment in that the lower bearing liner 2a has, in an upstream end portion thereof in the rotational direction of the rotor 1, another clearance portion. The another clearance portion is provided by cutting out the sliding surface 9a of the lower bearing liner 2a in a upstream end portion thereof, thereby forming a cut-away portion 7b. The cut-away portion 7b extends, in the bearing width direction, over a part or a whole of the bearing width thereby forming a space between the lower bearing liner 2a and the rotor 1.

Referring to FIG. 3 showing the oil film pressure distribution 10, the oil film pressure is small over a portion ranging from 0° to 40° in angle, measured in the rotational direction of the rotor 1, of the sliding surface 9a (in other words, over a portion ranging from 50° to 90° in angle measured, in the counter-rotational direction of the rotor 1, from the direction of the load applied by the rotor 1). Forming the cut-away portion 7b on the above portion of the sliding surface 9a extending in the bearing width direction over a part or a whole of the bearing width does not much affect the oil film pressure distribution 10 while doing so makes it possible to further reduce the bearing loss. With both the cut-away portion 7a and the cut-away portion 7b provided, each oil supply hole 5a is provided downstream of the border between the cut-away portion 7b and the sliding surface 9a. This embodiment, while also realizing the effects of the first embodiment, makes it possible to further reduce the bearing loss due to oil film shearing.

EXAMPLE 3

Figure 5:
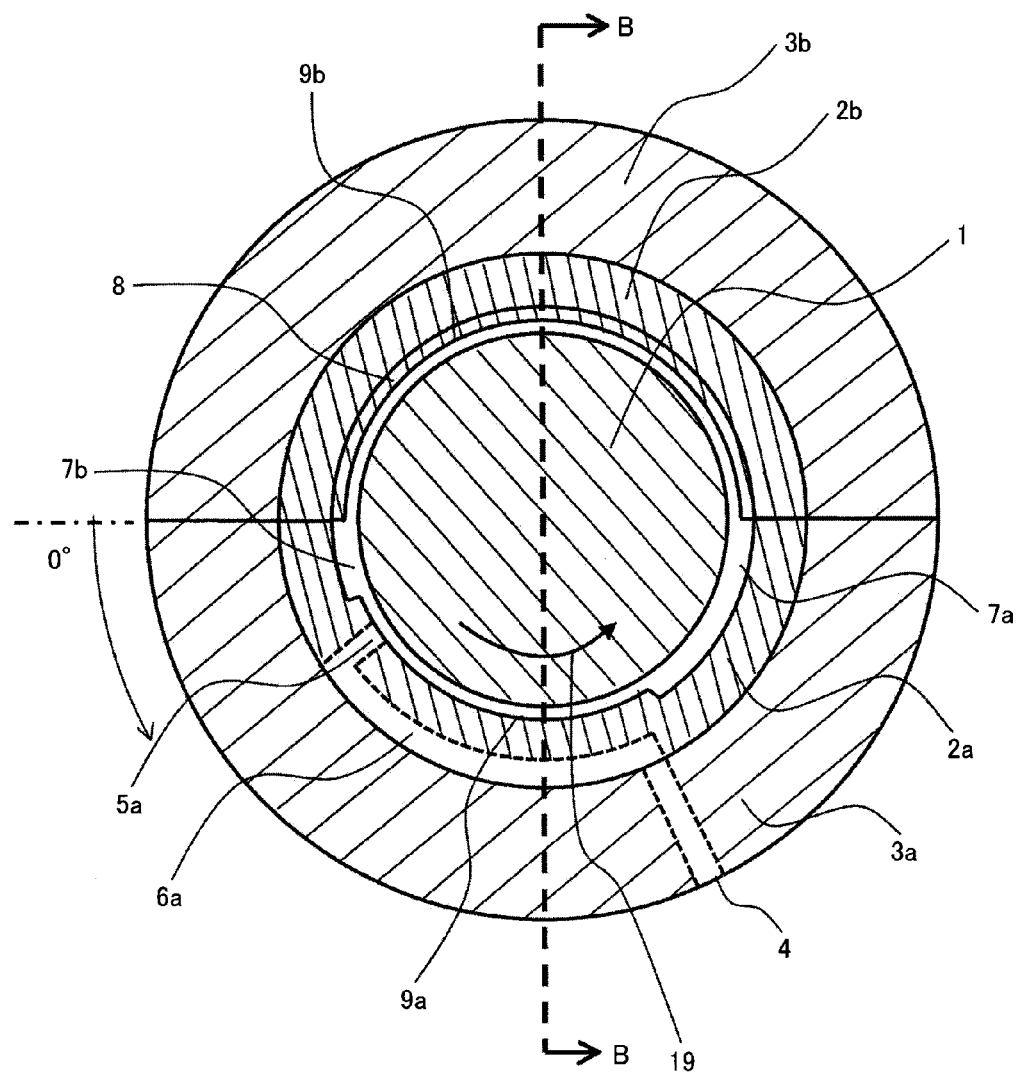
FIG. 5 is a vertical cross-sectional view of a journal bearing device according to a third embodiment of the present invention.
Figure 6:
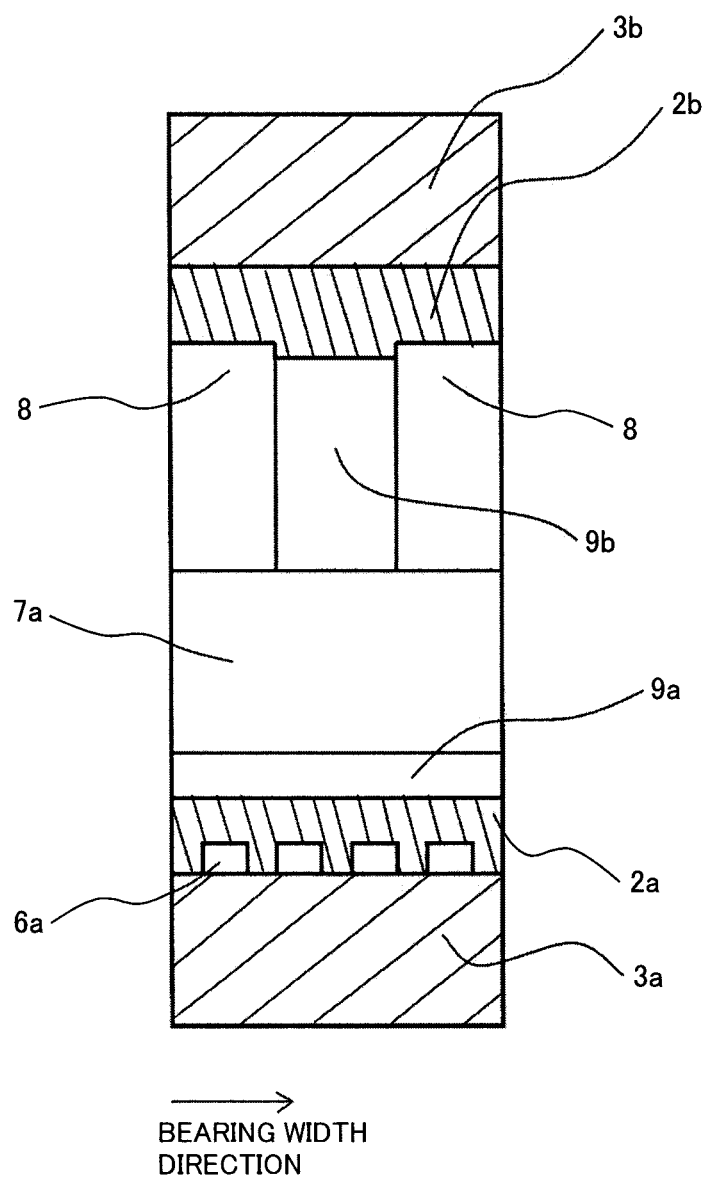
FIG. 6 is an example of a sectional view, taken along line B-B in FIG. 5, of the journal bearing device shown in FIG. 5.
Figure 7:
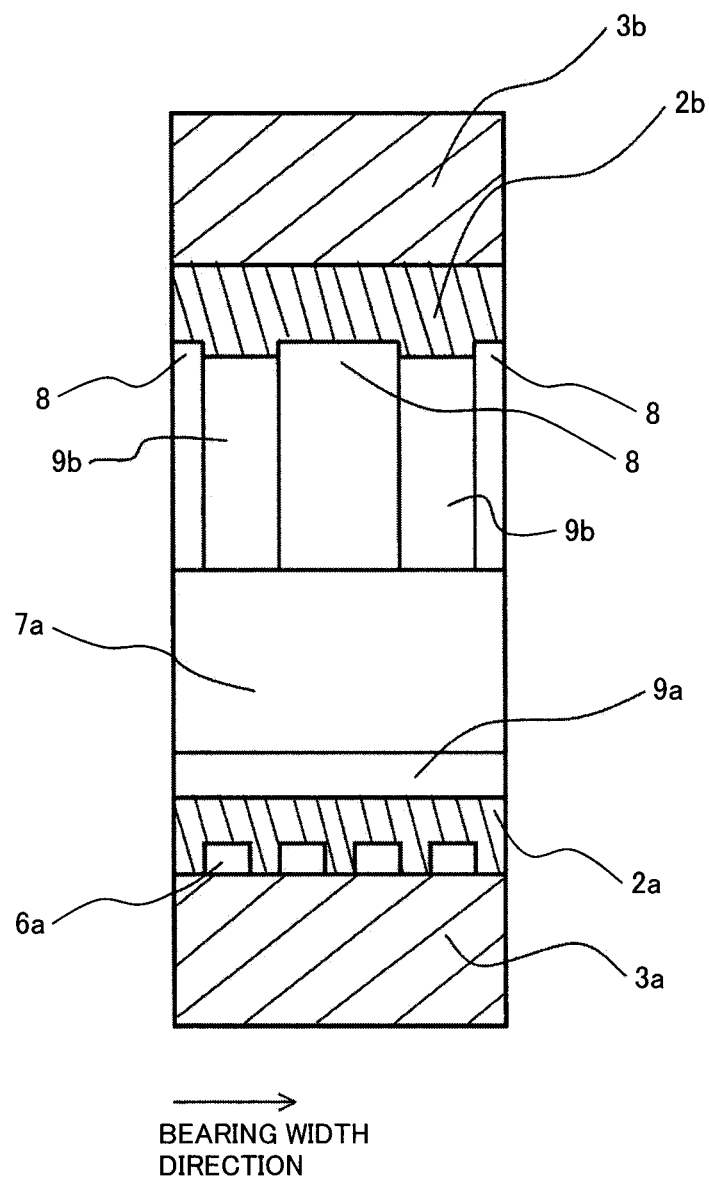
FIG. 7 is another example of a sectional view, taken along line B-B in FIG. 5, of the journal bearing device shown in FIG. 5.

A third embodiment of the present invention will be described below with reference to FIGS. 5 to 7. In FIGS. 5 to 7, constituent elements identical to those used in the first or second embodiment will be assigned identical reference numerals and their description will be omitted.

FIG. 5 is a vertical cross-sectional view of a journal bearing device according to the third embodiment of the present invention. The third embodiment differs from the first and second embodiments in the construction of the upper bearing liner 2b. The upper bearing liner 2b of the third embodiment has grooves 8 (cut-away portions) extending in the circumferential direction on the surface of the upper bearing liner 2b.

FIG. 6 is a sectional view, taken along line B-B in FIG. 5, of the journal bearing device shown in FIG. 5. In FIG. 6, the rotor 1 is omitted. According to the third embodiment, the upper bearing liner 2b has a sliding surface 9b formed on the inner surface thereof to be in a middle portion in the bearing width direction with a groove 8 extending in the circumferential direction provided on each side in the bearing width direction of the sliding surface 9b. Each groove 8 makes up a cut-away portion extending in the circumferential direction on each side of the sliding surface 9b thereby forming a space between the upper bearing liner 2b and the rotor 1. This construction reduces the sliding surface area of the upper part of the bearing.

The upper part of the bearing serves as a guide in case the rotor 1 is caused, by whatever factor, to swingingly rotate and it need not support the load of the rotor 1. The area of the sliding surface of the upper part of the bearing can, therefore, be reduced. The present embodiment, while also realizing the effects of the first embodiment, makes it possible to further reduce the bearing loss by reducing the sliding area of the upper part of the bearing.

The sliding surface 9b and the grooves 8 need not necessarily be arranged as shown in FIG. 6. For example, as shown in FIG. 7, the upper part of the bearing may have two sliding surfaces 9b separated from each other in the bearing width direction with a groove 8 formed between them and with another groove 8 formed on the outer side of each of them. This arrangement also reduces the sliding surface area, so that it is effective in reducing the bearing loss.

EXAMPLE 4

A fourth embodiment of the present invention will be described below.

Figure 8:
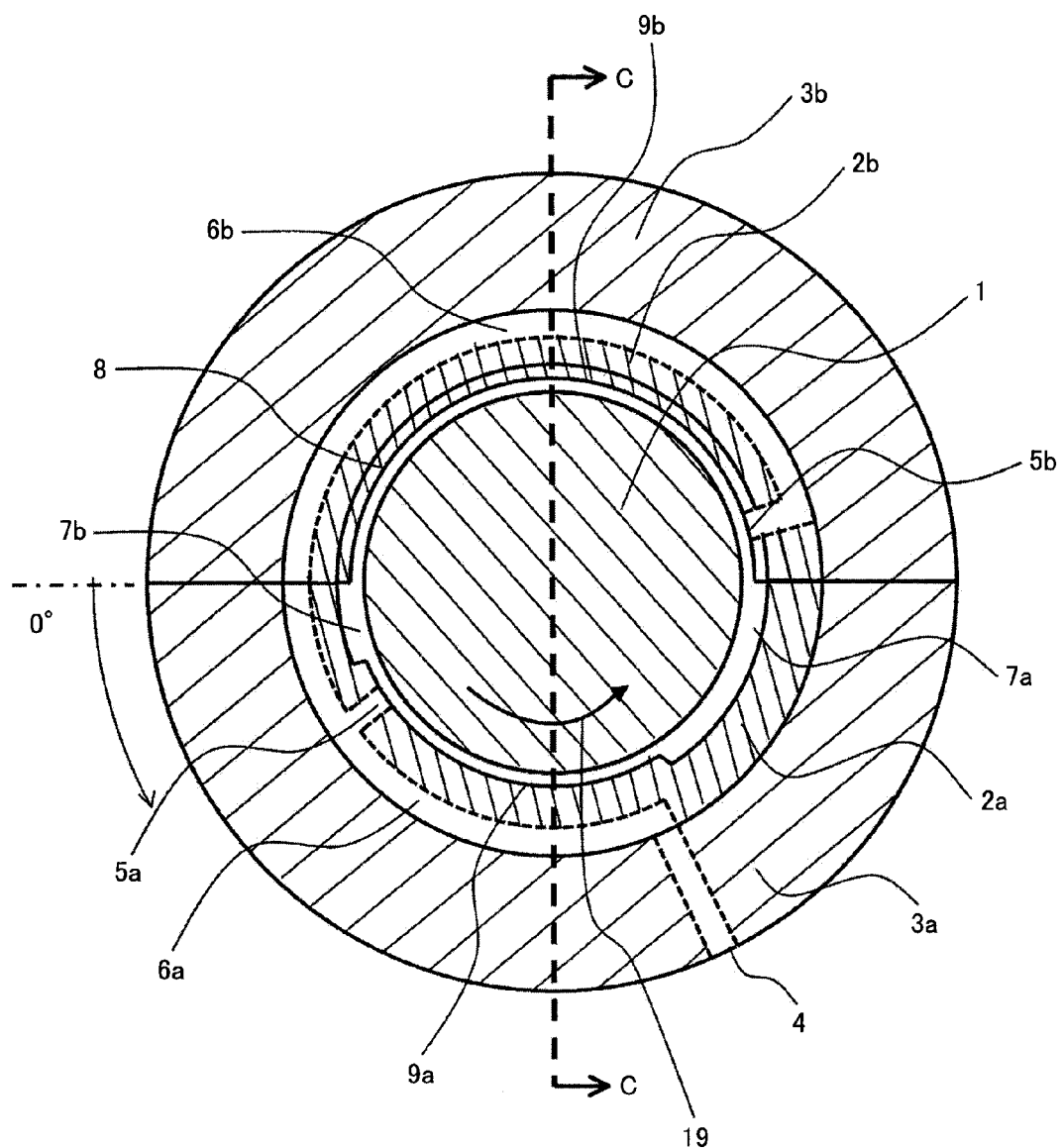
FIG. 8 is a vertical cross-sectional view of a journal bearing device according to a fourth embodiment of the present invention.

FIG. 8 is a vertical cross-sectional view of a journal bearing device according to the fourth embodiment of the present invention. In the fourth embodiment, the oil paths 6a provided in the lower part of the bearing are branched to be communicated with one or more oil paths 6b formed on the upper bearing liner 2b. The oil path 6b extends in the circumferential direction along the back side of the sliding surface 9b of the upper part of the bearing and is communicated with an oil supply hole 5b open at an upstream end portion, in the rotational direction of the rotor 1, of the sliding surface 9b.

Figure 9:
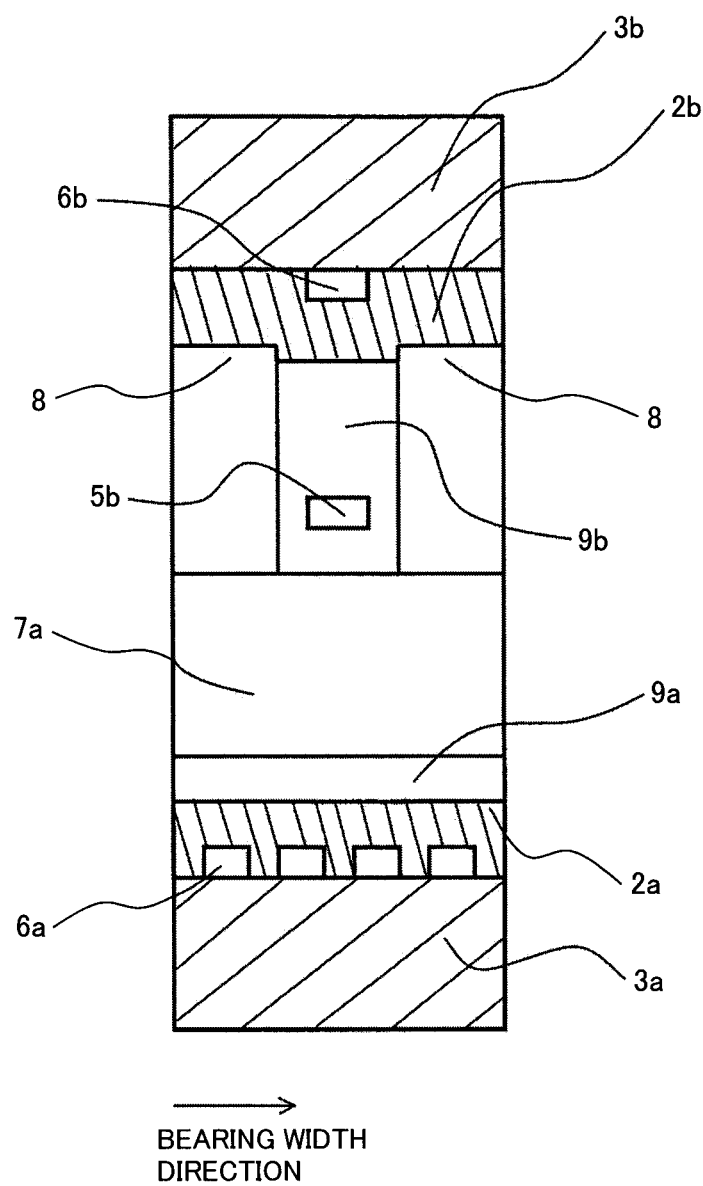
FIG. 9 is an example of a sectional view, taken along line C-C in FIG. 8, of the journal bearing device shown in FIG. 8.

FIG. 9 is a sectional view, taken along line C-C in FIG. 8. The sliding surface 9b of the upper part of the bearing is provided in a center portion in the bearing width direction with a groove 8 extending in the circumferential direction on each side of the sliding surface 9b. With the grooves 8 provided, the area of the sliding surface 9b is reduced, so that, compared with the lower part having the oil paths 6a, the upper part of the bearing may have fewer oil paths 6b. The oil path 6b is provided on the outer circumferential side of the sliding surface 9b.

In the present embodiment, part of the lubricant flowing down the oil paths 6a enters the oil path 6b of the upper part of the bearing to be supplied to the sliding surface 9b via the oil supply hole 5b. In this arrangement, the lubricant is supplied to both the sliding surface 9a and the sliding surface 9b, so that, in case the rotor 1 swingingly rotates, damage to the sliding surface 9b can be suppressed.

Figure 10:
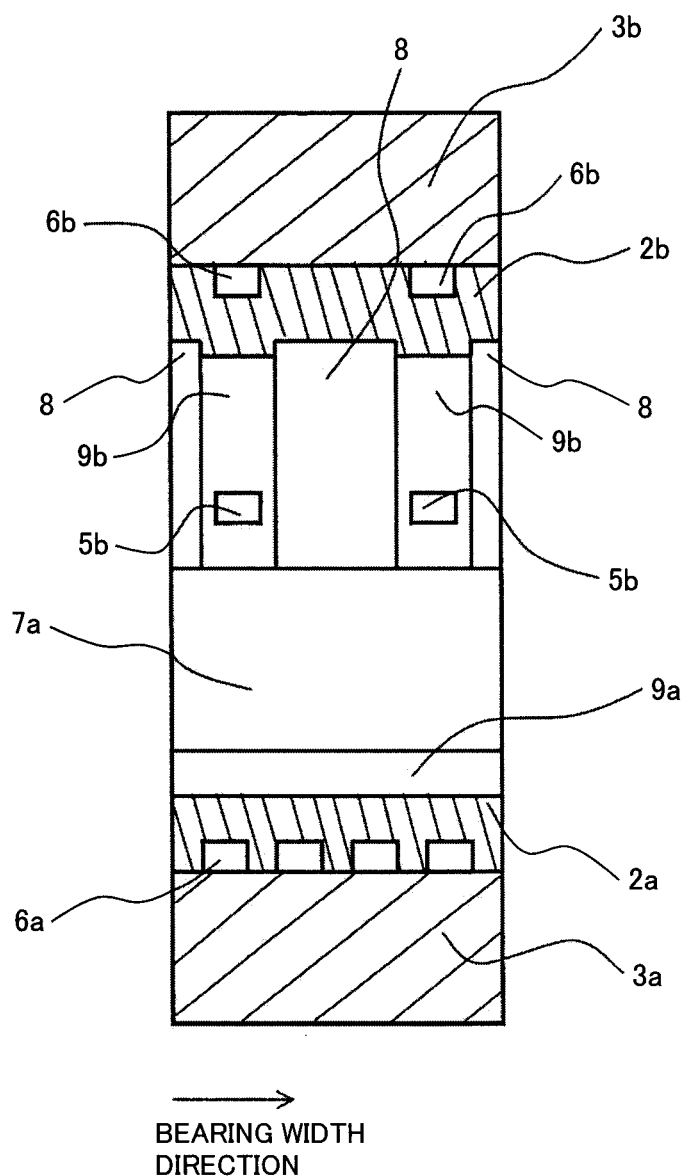
FIG. 10 is another example of a sectional view, taken along line C-C in FIG. 8, of the journal bearing device shown in FIG. 8.

The positional arrangement of the sliding surface 9b, grooves 8, and the oil path 6b need not necessarily be as shown in FIG. 9. For example, as shown in FIG. 10, the upper part of the bearing may have two sliding surfaces 9b separated from each other in the bearing width direction with a groove 8 provided between them and with another groove 8 provided on the outer side of each of them. In this arrangement, an oil path 6b is provided on the outer circumferential side of each of the two sliding surfaces 9b. Thus, there are cases in which, as shown in FIG. 10, the upper part of the bearing has plural sliding surfaces depending on the sliding surface and groove arrangement in the upper part of the bearing. In such cases, it is effective to provide, in the upper part of the bearing, as many oil paths 6b as the number of sliding surfaces.

Next, an example of rotary machine to which the journal bearing device according to the present invention is applied will be described. The journal bearing device according to the present invention can be applied to, for example, turbomachinery such as steam turbines, gas turbines, and compressors in particular.

Figure 11:
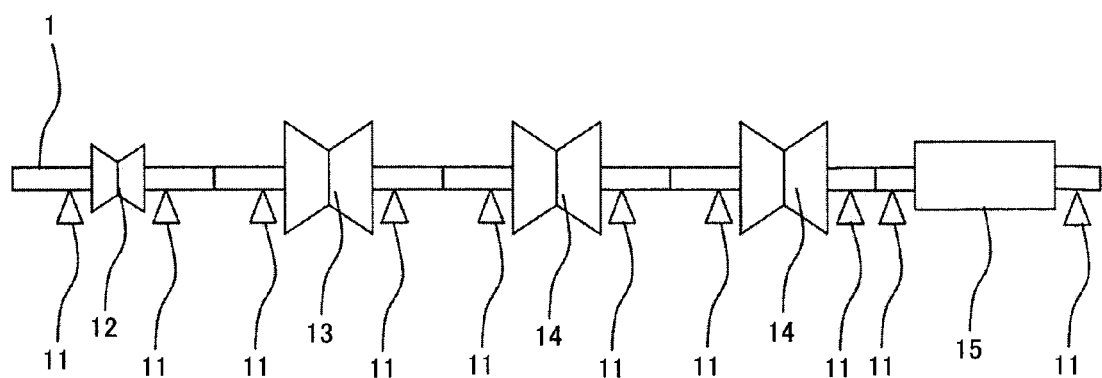
FIG. 11 is a schematic diagram showing construction of a steam turbine.

FIG. 11 is a schematic diagram showing main components of a steam turbine. Generally, a steam turbine used at a thermal power generation plant has a multi-span construction in which a high pressure turbine 12, an intermediate pressure turbine 13, a low pressure turbine 14, and a generator 15 are coupled by a rotor 1 for efficiency improvement. Even though it is desirable to adopt the journal bearing device according to the present invention for every one of the bearing devices 11 shown in FIG. 11, adopting the journal bearing device according to the present invention for only some of the bearing devices 11 will also contribute toward reducing loss in the turbine and the amount of lubricant used for the turbine.

Figure 12:
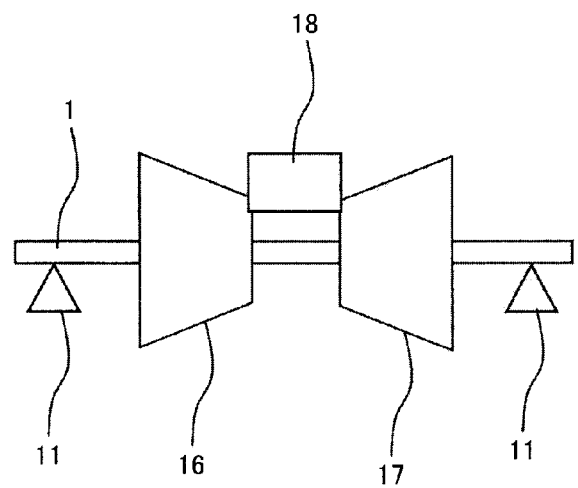
FIG. 12 is a schematic diagram showing construction of a gas turbine.

FIG. 12 is a schematic diagram showing main components of a gas turbine. The gas turbine includes a compressor 16 for compressing air, a combustion device 18 which generates combustion gas by combusting fuel together with the air compressed by the compressor 16, and a turbine 17 rotationally driven by the combustion gas generated by the combustion device 18. The compressor 16 and the turbine 17 are coupled by the rotor 1. The rotor 1 is rotatably supported by bearing devices 11. In this case, too, adopting the journal bearing device according to the present invention for the bearing devices 11 shown in FIG. 12 will contribute toward reducing loss in the turbine and the amount of lubricant used for the turbine.

REFERENCE SIGNS LIST

1 Rotor
2a Lower bearing liner
2b Upper bearing liner
3a Lower base metal
3b Upper base metal
4 Oil supply path
5a, 5b Oil supply hole
6a, 6b Oil path
7a, 7b Cut-away portion
8 Groove
9, 9a, 9b Sliding surface
10 Pressure distribution
11 Bearing device
12 High pressure turbine
13 Intermediate pressure turbine
14 Low pressure turbine
15 Generator
16 Compressor
17 Turbine
18 Combustion device
19 Rotational direction of the rotor

The invention claimed is:

1. A journal bearing device comprising:
an upper bearing liner included in an upper part thereof;
a lower bearing liner included in a lower part thereof;
an upper base metal provided on an outer circumferential side of the upper bearing liner; and
a lower base metal provided on an outer circumferential side of the lower bearing liner;
wherein the lower bearing liner is divided into a sliding portion having a sliding surface and a clearance portion provided with a space between the lower bearing liner and a rotor to be supported by the bearing device and provided in a downstream end portion of the lower bearing liner in the rotational direction of the rotor, and is provided with an oil path formed on a back side of the sliding portion and extending from a border portion between the sliding portion and the clearance portion toward an upstream side in the rotational direction of the rotor, and an oil supply hole extending from an upstream end portion of the oil path to the sliding surface of the sliding portion, wherein the lower base metal has an oil supply path to be supplied with lubricant from outside the bearing device and extending from an outer circumferential side of the lower base metal to the oil path at the border portion, and wherein the bearing device is configured such that whole lubricant to be supplied into the bearing device passes through the oil path.

2. The journal bearing device according to claim 1, wherein the upper bearing liner is provided with a sliding surface formed in a portion thereof in the bearing width direction and extending in the circumferential direction thereof for guiding the rotor and a cut-away portion formed in another portion thereof in the bearing width direction for forming a space between the upper bearing liner and the rotor and extending in the circumferential direction thereof.

3. The journal bearing device according to claim 2, wherein the oil path extends over the outer circumferential side of the upper bearing liner, and wherein the upper bearing liner is provided with a oil supply hole which is open to the sliding surface of the upper bearing liner so that the lubricant flowing down the oil path is supplied onto the sliding surface of the upper bearing liner.

4. The journal bearing device according to claim 1, wherein the clearance portion of the lower bearing liner is provided by cutting out the sliding surface of the lower bearing liner partly along a bearing width direction in a downstream end portion thereof, thereby forming a cut-away portion.

5. The journal bearing device according to claim 4, wherein the cut-away portion of the clearance portion of the lower bearing liner is formed in a range of which an oil film pressure becomes substantially zero when the cut-away portion is not provided.

6. The journal bearing device according to claim 4, wherein another cut-away portion is formed by cutting out a portion of the sliding surface of the lower bearing liner, the portion ranging from 50° to 90° in angle measured from the direction of the rotor load in the counter-rotational direction of the rotor and extending, in the bearing width direction, over a part or a whole of the bearing width.

7. The journal bearing device according to claim 4, wherein the cut-away portion of the clearance portion of the lower bearing liner ranges from 30° to 90° in angle measured from a direction of a rotor load in the rotational direction of the rotor.

8. The journal bearing device according to claim 7, wherein another cut-away portion is formed by cutting out a portion of the sliding surface of the lower bearing liner, the portion ranging from 50° to 90° in angle measured from the direction of the rotor load in the counter-rotational direction of the rotor and extending, in the bearing width direction, over a part or a whole of the bearing width.

9. The journal bearing device according to claim 4, wherein the upper bearing liner is provided with a sliding surface formed in a portion thereof in the bearing width direction and extending in the circumferential direction thereof for guiding the rotor and a cut-away portion formed in another portion thereof in the bearing width direction for forming a space between the upper bearing liner and the rotor and extending in the circumferential direction thereof.

10. The journal bearing device according to claim 9, wherein another cut-away portion is formed by cutting out a portion of the sliding surface of the lower bearing liner, the portion ranging from 50° to 90° in angle measured from the direction of the rotor load in the counter-rotational direction of the rotor and extending, in the bearing width direction, over a part or a whole of the bearing width.

11. The journal bearing device according to claim 9, wherein the cut-away portion of the clearance portion of the lower bearing liner ranges from 30° to 90° in angle measured from a direction of a rotor load in the rotational direction of the rotor.

12. The journal bearing device according to claim 11, wherein another cut-away portion is formed by cutting out a portion of the sliding surface of the lower bearing liner, the portion ranging from 50° to 90° in angle measured from the direction of the rotor load in the counter-rotational direction of the rotor and extending, in the bearing width direction, over a part or a whole of the bearing width.

13. The journal bearing device according to claim 9, wherein the oil path extends over the outer circumferential side of the upper bearing liner, and wherein the upper bearing liner is provided with a oil supply hole which is open to the sliding surface of the upper bearing liner so that the lubricant flowing down the oil path is supplied onto the sliding surface of the upper bearing liner.

14. The journal bearing device according to claim 13, wherein another cut-away portion is formed by cutting out a portion of the sliding surface of the lower bearing liner, the portion ranging from 50° to 90° in angle measured from the direction of the rotor load in the counter-rotational direction of the rotor and extending, in the bearing width direction, over a part or a whole of the bearing width.

15. The journal bearing device according to claim 13, wherein the cut-away portion of the clearance portion of the lower bearing liner ranges from 30° to 90° in angle measured from a direction of a rotor load in the rotational direction of the rotor.

16. The journal bearing device according to claim 15, wherein another cut-away portion is formed by cutting out a portion of the sliding surface of the lower bearing liner, the portion ranging from 50° to 90° in angle measured from the direction of the rotor load in the counter-rotational direction of the rotor and extending, in the bearing width direction, over a part or a whole of the bearing width.

17. A rotary machine comprising:
a rotor; and
a bearing device supporting the rotor, the bearing device being the journal bearing device according to claim 1.

* * * * *